United States Patent [19]
Kobayashi

[11] Patent Number: 5,751,857
[45] Date of Patent: May 12, 1998

[54] IMAGE PROCESSING METHOD

[75] Inventor: Shigetada Kobayashi, Tokyo, Japan

[73] Assignee: Canon Kaubshiki Kaisha, Tokyo, Japan

[21] Appl. No.: 576,904

[22] Filed: Dec. 22, 1995

[30] Foreign Application Priority Data

Dec. 26, 1994 [JP] Japan ................................ 6-322411

[51] Int. Cl.$^6$ ...................................................... G06K 9/36
[52] U.S. Cl. ............... 382/232; 382/240; 341/56; 345/112; 345/202; 345/214
[58] Field of Search ........................ 382/232, 240; 358/500, 508; 345/112, 202, 214; 341/56

[56] References Cited

U.S. PATENT DOCUMENTS

| | | | |
|---|---|---|---|
| 4,742,558 | 5/1988 | Ishibashi et al. | 382/240 |
| 4,858,017 | 8/1989 | Torbey | 382/240 |
| 5,050,230 | 9/1991 | Jones et al. | 382/240 |
| 5,140,441 | 8/1992 | Sugiura et al. | 358/456 |
| 5,162,925 | 11/1992 | Takaoka et al. | 358/447 |
| 5,521,717 | 5/1996 | Maeda | 382/240 |
| 5,561,536 | 10/1996 | Sugiura et al. | 358/500 |

*Primary Examiner*—Jose L. Couso
*Assistant Examiner*—Anh Hong Do
*Attorney, Agent, or Firm*—Fitzpatrick, Cella, Harper & Scinto

[57] ABSTRACT

An image processor performs a processing method which includes (a) reading out hierarchical-encoded binary image data stored in a storing medium, (b) decoding the binary image data read out in the step (a), (c) performing a multi-level generation to the binary image data decoded in the step (b), and (d) causing a display device to display an image, on the basis of the data decoded in the step (b) or the data multi-level generation processed in the step (c), wherein, in a case of causing the display device to display the image on the basis of data having a resolution which is higher than the resolution of the display device, the image is displayed in the step (d) after the binary image data is multi-level generation processed in the step (c), thereby preventing deterioration of the image when the image data stored in the storing medium is output.

14 Claims, 4 Drawing Sheets

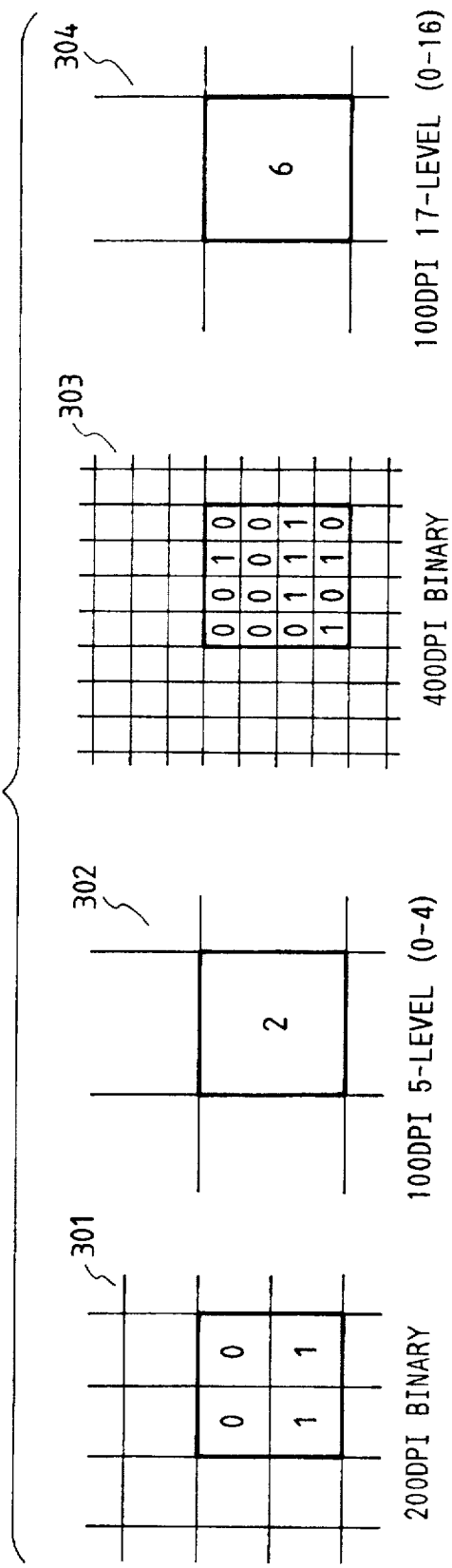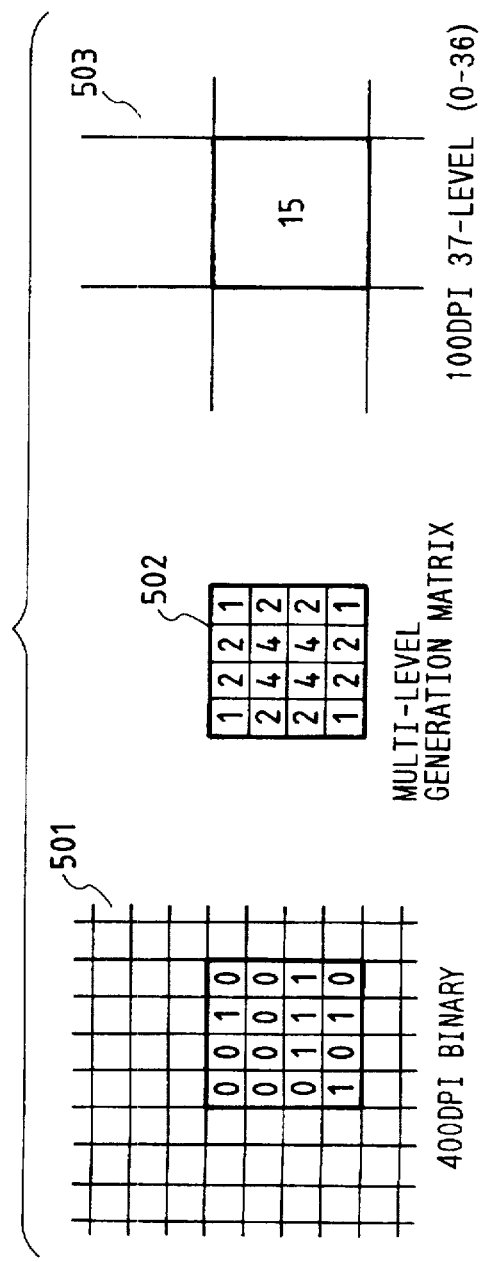

IMAGE PROCESSING METHOD

BACKGROUND OF THE INVENTION

1. Field of the Invention

The present invention relates to an image processing method, and more particularly to an image processing method when image data stored in a storing medium is output.

2. Related Background Art

Hitherto, a filing system is known which stores in a storing medium plural image data as a file together with keywords for searching the image data, searches the stored image data by inputting the keyword or the like, displays the image data on a display device, and prints out the image data by a printer. In this type of system, a resolution of the printer is usually higher than that of the display device. Thus, the image data is stored in the storing medium at the resolution suitable for the printer. However, if the stored image data is to be displayed on the display device, the image data is thinned out such that the resolution of the image data coincides with that of the display device, whereby a serious problem occurs where image quality is deteriorated due to such thinning process.

SUMMARY OF THE INVENTION

The present invention is applied in consideration of the above-mentioned problem and an object thereof is to prevent the serious deterioration of an image when image data stored in a storing medium is output.

Another object of the present invention is to enable to quickly search image data stored in a storing medium.

Still another object of the present invention is to enable to utilize a general display device.

The above-mentioned objects of the present invention and other objects will become apparent from the following detailed description based on the attached drawings.

BRIEF DESCRIPTION OF THE DRAWINGS

FIG. 3 is a view for describing a multi-level generation process for a binary image;

FIG. 5 is a view for describing another example of a multi-level generation process of a binary image.

DETAILED DESCRIPTION OF THE PREFERRED EMBODIMENTS

An embodiment of the present invention is described in detail below with reference to the drawings.

Figure 1:
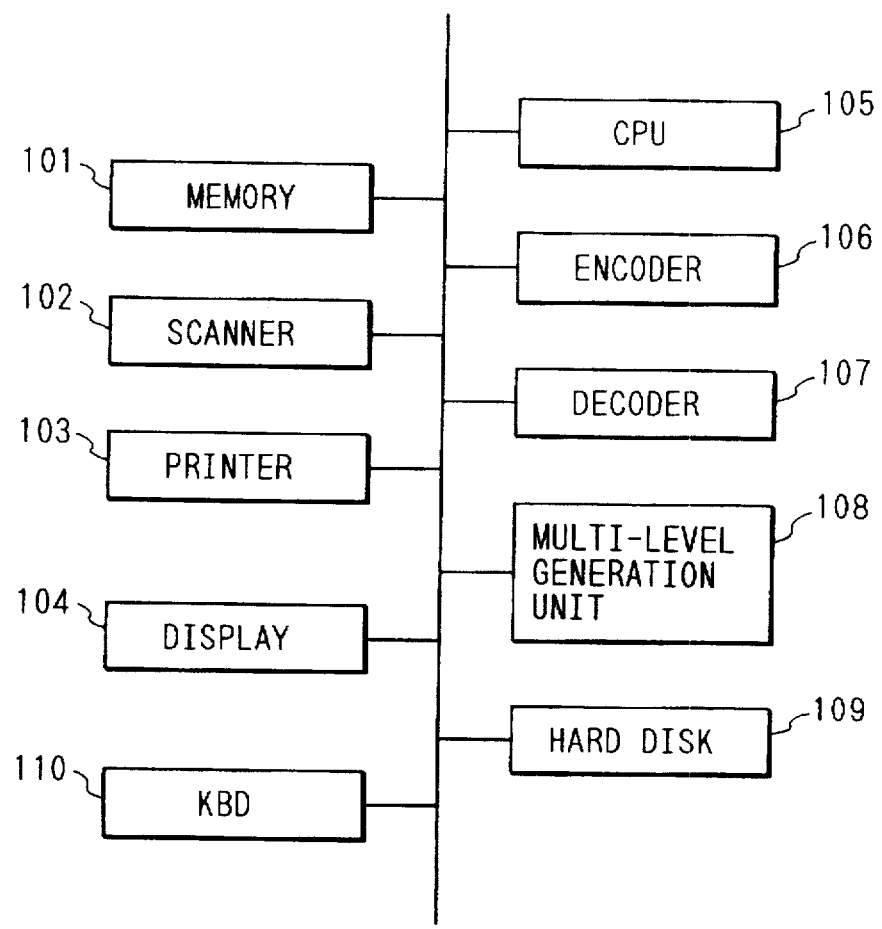
FIG. 1 is a block diagram showing the structure of an image processing apparatus according to an embodiment of the present invention.

FIG. 1 is a block diagram showing an outline of the structure of an image processing apparatus according to the present invention.

In FIG. 1, a memory 101 is composed of a read only memory (ROM) which stores a program for controlling the image processing apparatus and a random access memory (RAM) which is used as a work area. A scanner 102 reads an original image with a resolution of 400 DPI×400 DPI for obtaining monochrome binary image data. A printer 103 prints a one-pixel binary image (the binary image for one pixel) in monochrome with the resolution of 400 DPI×400 DPI. A display 104 has a displaying capacity of 8-bit and 256-gradation for each of R, G and B colors. However, in this embodiment, an example for treating a monochrome image is described. In this case, a monochrome image is displayed by switching a pixel size in accordance with the gradation number of one pixel of image data. That is, an image is displayed in such manner as an image is represented by ON or OFF of a dot if binary, and an image is represented with five stages per one pixel depending on OFF of a dot or the four stages of pixel size if 5-level. A CPU 105 controls the entire image processing apparatus on the basis of the program stored in the memory 101. An encoder 106 compressively encodes image data to perform a hierarchical encoding (an encoding for each of plural resolutions) of binary image data. Concretely, an encoding of a known JBIG system is performed. A decoder 107 expansively decodes image data to execute a process for returning the compressive-encoded data as mentioned above to original image data. At this time, image data of the most coarse resolution is first decoded to output it after performing a scaling for coinciding it with the resolution of the display 104, and then, the resolution is sequentially caused to be increased. Ordinary, the resolution is slowly increased responding to passing of time. However, by designating the resolution, the image data can be output with the designated resolution. A multi-level generation unit 108 converts one-pixel binary image data into one-pixel multi-level image data and executes a process for decreasing the resolution (the number of pixels) of the binary image data to increase the number of gradations per one pixel. A hard disk 109 stores the compressed image data. There is provided a key board 110 to which searching information, various commands or the like are input by an operator. The above-mentioned parts are connected to each other by a system bus.

Figure 2:
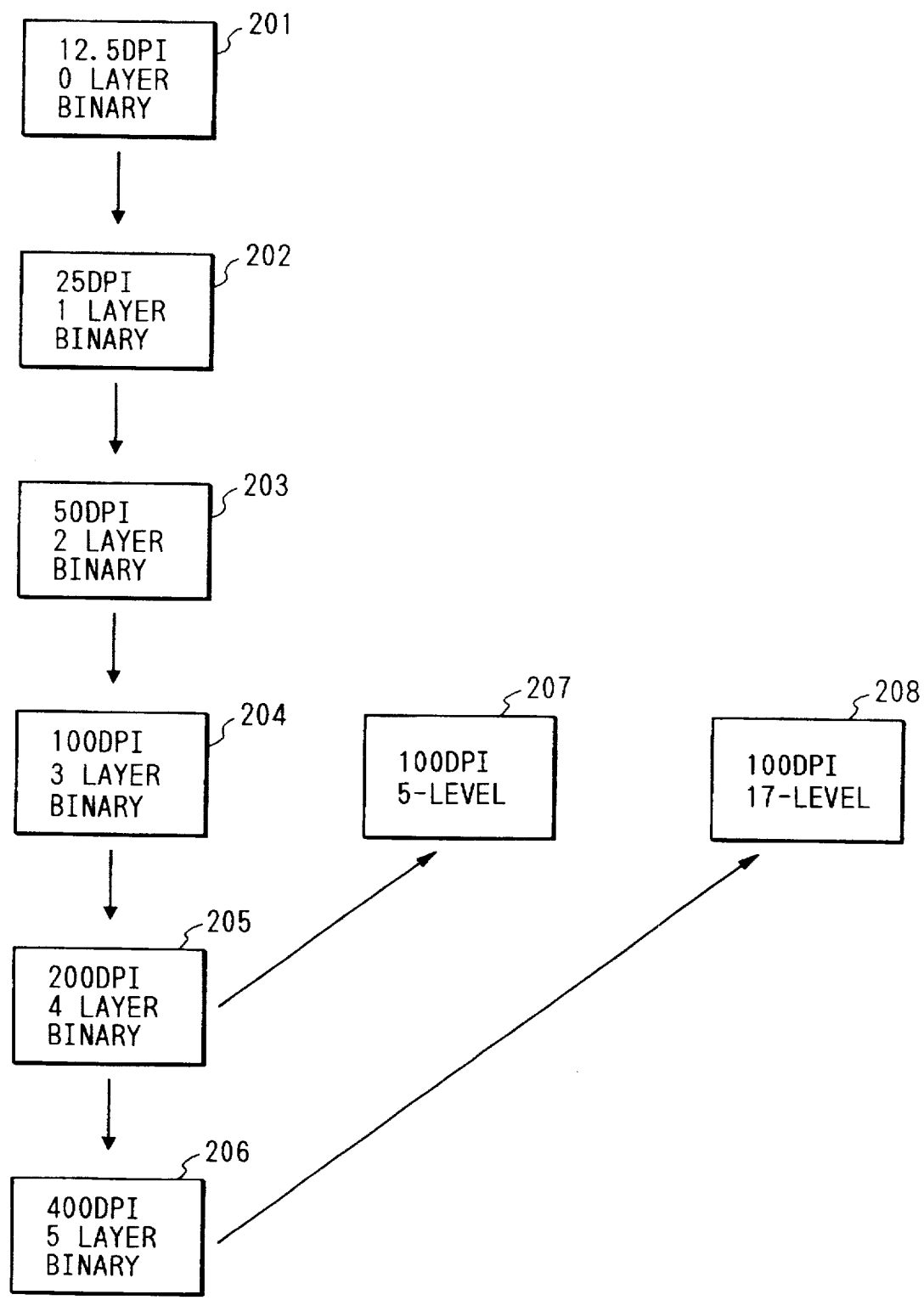
FIG. 2 is a view for describing a hierarchicality of an image to be stored in a hard disk.

FIG. 2 is a view for describing a hierarchicality of an image. An image which is read by the scanner 102 or an image to be output by the printer 103 is a binary image with the resolution of 400 DPI indicated by a reference numeral 206. When this data is compressed in the JBIG system by designating 5-layer (an image of the most coarse resolution is encoded, and then difference data for each resolution is encoded) to expand the resulted data, an image of 0th layer indicated by a reference numeral 201 is initially obtained. In this example, since an initial original image indicates the resolution of 400 DPI, the resolution of an image of the most coarse resolution corresponds to 12.5 DPI. Upon executing an expansion process responding to the passing of time, the image is expanded to an image with a resolution of 25 DPI of a first layer indicated by a reference numeral 202. Then, the image is expanded to an image with a resolution of 50 DPI of a second layer indicated by a reference numeral 203, and expanded to an image with a resolution of 100 DPI of a third layer indicated by a reference numeral 204, and further expanded to an image with a resolution of 200 DPI of a fourth layer indicated by a reference numeral 205. Finally, the image is expanded to an image with a resolution of 400 DPI of a fifth layer indicated by a reference numeral 206. This is the same as the original image. In this embodiment, the image of the fourth layer indicated by the reference numeral 205 is multi-level processed to convert it into an image (207) which is 5-level processed with a resolution of 100 DPI as indicated by the reference numeral 207 for displaying it. Further, the image of the fifth layer indicated by the reference numeral 206 is multi-level processed to convert it into an image which is 17-level processed with a resolution of 100 DPI as indicated by a reference numeral 208 for displaying it.

In case where a searching is sequentially performed with displaying the image, a user can quickly obtain an outline of image at first by the data having the hierarchicality depending on the resolution. That is, since an image having a high resolution can be gradually obtained, in a case where the searching is performed while observing the image, a process for needlessly expanding an excellent image is omitted by interrupting a process for expanding an image which has a high resolution by instructing a displaying of the next image, thereby enabling to improvement of an operability. An excellent image can also be obtained by leaving the device as is.

An excellent image can be obtained in proportion to increasing of the resolution. However, an image can not be displayed at a resolution which exceeds the resolution of the display 104. At this time, an image is enlarged and displayed rather than the resolution being increased. That is, a detailed portion can be accurately visualized, but an entire image becomes inaccurate. Therefore, when the resolution reaches that of the display 104, it is possible to execute a process for displaying an image by interrupting an expansion operation. However, in order to display the more excellent (high quality) image, an image is displayed in the binary form (only ON or OFF of a dot) as is until the resolution reaches that of the display 104, and an image is displayed by converting information of the resolution into information of the gradation when the resolution exceeds that of the display 104, in a case where the image which is formed corresponding to the resolution of the scanner 102 or the printer 103 is displayed at the resolution of the display 104.

FIG. 3 is a view showing an example of a multi-level generation process to binary image which process represents a conversion process of the resolution information into gradation information. A reference numeral 301 denotes a state of a binary pixel having a resolution 200 DPI. In the state 301, each pixel has a value of 0 or 1, and the value is multi-level processed to obtain a one-pixel 5-level image having a resolution of 100 DPI shown in a state 302. In this example, with respect to one pixel of the state 302 belonging to the same position as that of four pixels in the state 301, the values of pixels in the state 301 are summed such that an obtained value is set to be a pixel value in the state 302 as is. Since each of the four pixels in the state 301 is expressed by a combination of 0 and 1 and therefor can obtain four kinds of values 0 to 4, the one-pixel 5-level image is obtained in the state 302. A state 303 represents an example of binary pixels having 400 DPI.

Similarly, with respect to one pixel of the state 304 belonging to the same position as that of 4×4 pixels in the state 303, the values of pixels in the state 303 are summed and then multi-level processed, so that 17-level image (0 to 16) is obtained in the state 304.

The display 104 in the present embodiment displays data having gradation by converting it into 8-bit 156-gradation data. Thus, scaling for converting 5-stage data into 255-stage data or converting 17-stage data into 255-stage data is performed.

That is, in one-pixel binary case, data of 0 and 1 are converted into 0 and 255 respectively, in one-pixel 5-level case, data of 0, 1, 2, 3 and 4 are converted into 0, 63, 127, 191 and 255 respectively, in one-pixel 17-level case, data of 0, 1, 2, 3, 4, 5, 6, 7, 8, 9, 10, 11, 12, 13, 14, 15 and 16 are converted into 0, 15, 25 31, 47, 63, 79, 95, 111, 127, 143, 159, 175, 191, 207, 223, 239 and 255 respectively.

Figure 4:
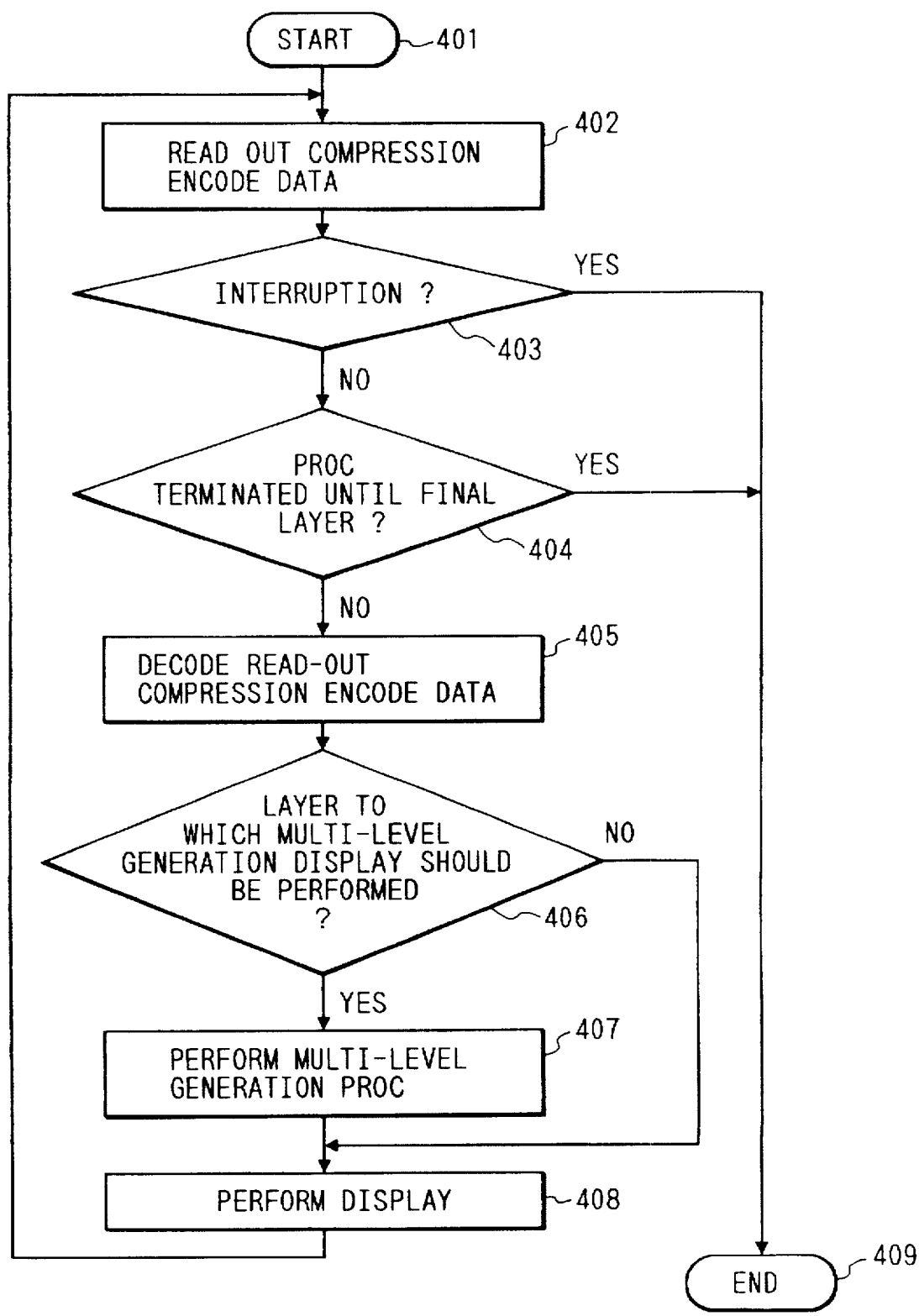
FIG. 4 is a flow chart for describing a procedure of a process when an image stored in a hard disk is displayed.

FIG. 4 is a flow chart showing a displaying process of the present embodiment. This flow chart is based on a program stored in the memory 101 and is controlled by the CPU 105. However, the same operation can be performed even if this program is stored in a detachable memory such as a floppy disk or the like and then loaded by another device.

At first, when a search is started for an image stored in the hard disk 109 as a file by inputting key words or the like from the keyboard 110, compressive encoding data of a corresponded image is selected for starting the displaying process (step 401). The hard disk 109 stores image data such that it can be output until the resolution of 400 DPI×400 DPI corresponding to the resolutions of the scanner 102 and the printer 103. In a step 402, compressive encoding data of a 12.5 DPI image which is an initial layer of the image selected in the searching process is read out. Then, in a step 403, it is discriminated whether an interruption of the displaying process is instructed. In this case, the interruption is made by instructing from the keyboard 110 to interrupt the displaying process if the present displaying state is sufficient for image confirmation, or by interrupting the displaying process of the presently-processed image with instructing to display a next image. In this operation, if the interruption instruction is input, the processing is terminated while leaving the present display state as is (a step 409). On the other hand, if it is instructed to display the next image, the processing again starts in the step 401. If it is not interrupted, the flow advances to a step 404 to judge whether the processing is terminated until the final layer. If the processing is terminated until the final layer, the entire processing is also terminated. If not in the step 404, the flow advances to a step 405 to decode the compressive encoding data read in the step 402. Then, in a step 406, it is judged whether the presently-decoded image reaches a layer to which multi-level generation displaying is to be performed (i.e., the resolution of the image exceeds that of the display 104). Here, it is assumed that the resolution of the display 104 has been preset and stored in the memory 101. That is, in the present embodiment, it is judged whether the image is equal to or more than a fourth layer. If it is judged that the image is the fourth or fifth layer, the flow advances to a step 407 to perform the multi-level generation processing as mentioned above. In a step 408, the image is displayed on the display 104 on the basis of the decoded data. Thereafter, the flow repeats the processing until it is judged that the processing of the final layer is terminated in the step 404 or it is instructed to interrupt the processing in the step 403. In other words, the difference data from the presently-displayed image is read in the step 402, and decoded in the step 405. Then, the decoded data is converted into the multi-level data if the multi-level generation processing is needed, and the presently-displayed image is rewritten and sequentially displayed in the step 408.

In the multi-level generation processing of the above embodiment, the multi-level is simply set to correspond to the number of density level "1" of the pixel in the high-resolution image corresponding to the target pixel of the low-resolution image. However, in order to preserve an edge component, a window processing may be performed in which weighting coefficients 502 are multiplied to 4×4 pixels 501 and values of the all pixels are summed, as shown in FIG. 5.

Further, if the resolution of the scanner is greatly different from that of the display, e.g., 1200 DPI for the scanner and 60 DPI for the display, an upper-limit resolution for multi-level generation displaying may be set so as to inhibit the processing for the portion from which a high image quality can not be obtained even if the multi-level generation is performed. For example, this type of processing can be performed by judgment as to the layer to be multi-level generation displayed, instead of a judgment as to the final layer in the step 404 of FIG. 4. Namely, it can be performed by terminating the processing if it is judged that the processing reaches the layer to be multi-level generation displayed. In addition, it can be performed by previously designating the resolution and terminating the display processing at the time when the displaying is performed based on the previously-designated resolution.

In the above embodiment, a case of treating a monochrome image is described. However, even if a color image is treated, the same processing can be performed. In such a case, the above processing is performed for each of the three color (R, G and B) data.

As described above, according to the present invention, the input image data is hierarchical encoded as data having a different-resolution layer structure and then is stored in the storing medium (i.e., hard disk) as the file. In this operation, in a case where a stored image is searched to be displayed on the display 104, the low-resolution image is first expanded and displayed, and then the high-resolution image is gradually displayed. Accordingly, the image to be first displayed can be displayed at a high speed, so that an operator can quickly search and recognize the image. Further, data whose resolution exceeds that of the display is converted into one-pixel multi-level data, so that a high-quality image can effectively be obtained. As a result, visualization of a character image can be especially improved.

Moreover, there is no need to make the resolution of the display high such that it coincides with that of the scanner and the printer, so that a low-cost general-purpose display can be used. It should be noted that the storing medium for storing the image data may be a detachable type such as an optical magnetic disk or the like.

The present invention is described above on the basis of the preferred embodiments. However, the present invention is not limited to such, and can be modified in various manners within the scope of following claims.

What is claimed is:

1. An image processing method comprising the steps of:
    (a) reading out hierarchically encoded binary image data stored in a storage medium;
    (b) sequentially decoding the binary image data read out in said step (a), in the order of a low-resolution image to a high-resolution image;
    (c) performing a multilevel generation to the binary image data decoded in said step (b);
    (d) causing a display device to display an image, on the basis of the image data decoded in said step (b) or the image data multilevel-generation processed in said step (c);
    (e) judging whether or not a resolution of the image data decoded in said step (b) is higher than a resolution of the display device in said step (d) to display the image on the basis of the image data; and
    (f) controlling said step (d) to cause the display device to display the image based on the image data multilevel-generation processed in said step (c) if YES in said step (e), and said step (d) to cause the display device to display the image based on the binary image data decoded ins said step (b) if NO in said step (e).

2. A method according to claim 1, wherein the hierarchical encoding in said step (a) is an encoding in a JBIG system.

3. A method according to claim 1, wherein the image data stored in the storing medium can be output at a resolution of a printer which is to be used for printing out the image based on the image data.

4. An image processing method comprising the steps of:
    (a) reading out hierarchically encoded binary image data stored in a storage medium;
    (b) sequentially decoding the binary image data read out in said step (a), in the order of a low-resolution image to a high-resolution image;
    (c) judging whether or not a resolution of the image decoded in said step (b) exceeds a predetermined resolution;
    (d) performing a multilevel generation to the binary image data decoded in said step (b);
    (e) causing a display device to display the image, on the basis of the image data decoded in said step (b) or the image data multilevel-generation processed in said step (d); and
    (f) controlling said step (e) to cause the display device to display the image based on the image data multilevel generation processed in said step (d) if YES in said step (c), and said step (e) to cause the display device to display the image based on the binary image data decoded in said step (b) if NO in said step (c).

5. A method according to claim 4, wherein the hierarchical encoding in said step (a) is an encoding in a JBIG system.

6. A method according to claim 4, wherein the image data stored in the storing medium can be output at a resolution of a printer which is to be used for printing out the image based on the image data.

7. An image processing method comprising the steps of:
    (a) reading out hierarchically encoded binary image data stored in a storage medium;
    (b) sequentially decoding the binary image data read out in said step (a), in the order of a low-resolution image to a high-resolution image;
    (c) sequentially switching the image decoded in said step (b) to cause a display device to display the switched image;
    (d) inputting an interruption instruction of the image switching to be displayed in said step (c);
    (e) performing a multilevel generation to the binary image data decoded in said step (b); and
    (f) controlling, in accordance with input timing of the interruption instruction in said step (d), the switching in said step (c) between the operation of causing the display device to display the image based on the binary image data decoded in said step (b) or the operation of causing the display device to display the image based on the image data multilevel-generation processed in said step (e).

8. A method according to claim 7, wherein the hierarchical encoding in said step (a) is an encoding in a JBIG system.

9. A method according to claim 7, wherein the image data stored in the storing medium can be output at a resolution of a printer which is to be used for printing out the image based on the image data.

10. A method according to claim 7, wherein said step (e) further includes a step of converting a resolution of the image data multilevel-generation processed, in correspondence with a resolution of the display device, and said step (c) causes the display device to perform the display in the resolution converted in said step (e), in accordance with the control in said step (f).

11. A method according to claim 7, further comprising a step of holding a display state in case of inputting the interruption instruction in said step (d).

12. A computer readable program, stored in a storage medium, for performing an image processing method comprising the steps of:

(a) reading out hierarchically encoded binary image data stored in a storage medium;

(b) sequentially decoding the binary image data read out in said step (a), in the order of a low-resolution image to a high-resolution image;

(c) performing a multilevel generation to the binary image data decoded in said step (b);

(d) causing a display device to display an image, on the basis of the image data decoded in said step (b) or the image data multilevel-generation processed in said step (c);

(e) judging whether or not a resolution of the image data decoded in said step (b) is higher than a resolution of the display device in said step (d) to display the image on the basis of the image data; and (f) controlling said step (d) to cause the display device to display the image based on the image data multilevel-generation processed in said step (c) if YES in said step (e), and said step (d) to cause the display device to display the image based on the binary image data decoded in said step (b) if NO in said step (e).

13. A computer readable program, stored in a storage medium, for performing an image processing method comprising the steps of:

(a) reading out hierarchically encoded binary image data stored in a storage medium;

(b) sequentially decoding the binary image data read out in said step (a), in the order of a low-resolution image to a high-resolution image;

(c) judging whether or not a resolution of the image decoded in said step (b) exceeds a predetermined resolution;

(d) performing a multilevel generation to the binary image data decoded in said step (b);

(e) causing a display device to display the image, on the basis of the image data decoded in said step (b) or the image data multilevel-generation processed in said step (d); and (f) controlling said step (e) to cause the display device to display the image based on the image data multilevel-generation processed in said step (d) if YES in said step (c), and said step (e) to cause the display device to display the image based on the binary image data decoded in said step (b) if NO in said step (c).

14. A computer readable program, stored in a storage medium, for performing an image processing method comprising the steps of:

(a) reading out hierarchically encoded binary image data stored in a storage medium;

(b) sequentially decoding the binary image data read out in said step (a), in the order of a low-resolution image to a high-resolution image;

(c) sequentially switching the image decoded in said step (b) to cause a display device to display the switched image;

(d) inputting an interruption instruction of the image switching to be displayed in said step (c);

(e) performing a multilevel generation to the binary image data decoded in said step (b); and (f) controlling, in accordance with input timing of the interruption instruction in said step (d), the switching in said step (c) between the operation of causing the display device to display the image based on the binary image data decoded in said step (b) or the operation of causing the display device to display the image based on the image data multilevel-generation processed in said (e).

* * * * *

UNITED STATES PATENT AND TRADEMARK OFFICE
CERTIFICATE OF CORRECTION

PATENT NO. : 5,751,857

DATED : May 12, 1998

INVENTOR : SHIGETADA KOBAYASHI

It is certified that error appears in the above-identified patent and that said Letters Patent is hereby corrected as shown below:

ON TITLE PAGE

[73] Assignee: "Canon Kaubshiki Kaisha" should read --Canon Kabushiki Kaisha--.

COLUMN 2 line 12, "the" should be deleted; and
   line 45, "resulted" should read --resulting--.

COLUMN 3 line 4, "a" should be deleted;
   line 5, "image" should read --the image--;
   line 12, "to improvement of an" should read --improvement of--;
   line 46, "therefor" should read --therefore--; and
   line 66, "25" should be deleted.

COLUMN 4 line 12, "corresponding" should read --corresponds--; and
   line 58, "a" should be deleted.

UNITED STATES PATENT AND TRADEMARK OFFICE
CERTIFICATE OF CORRECTION

PATENT NO. : 5,751,857

DATED : May 12, 1998

INVENTOR : SHIGETADA KOBAYASHI

It is certified that error appears in the above-identified patent and that said Letters Patent is hereby corrected as shown below:

COLUMN 5

```
line 18, "hierarchical" should read --hierarchically--;
         and
line 20, "the" should read --a--; and
line 65, "ins" should read --in--.
```

Signed and Sealed this

Twenty-third Day of February, 1999

Q. TODD DICKINSON

*Attest:*

*Attesting Officer*           Acting Commissioner of Patents and Trademarks